(No Model.)
W. R. WHITE.
SWINGING GATE.
No. 461,061. Patented Oct. 13, 1891.
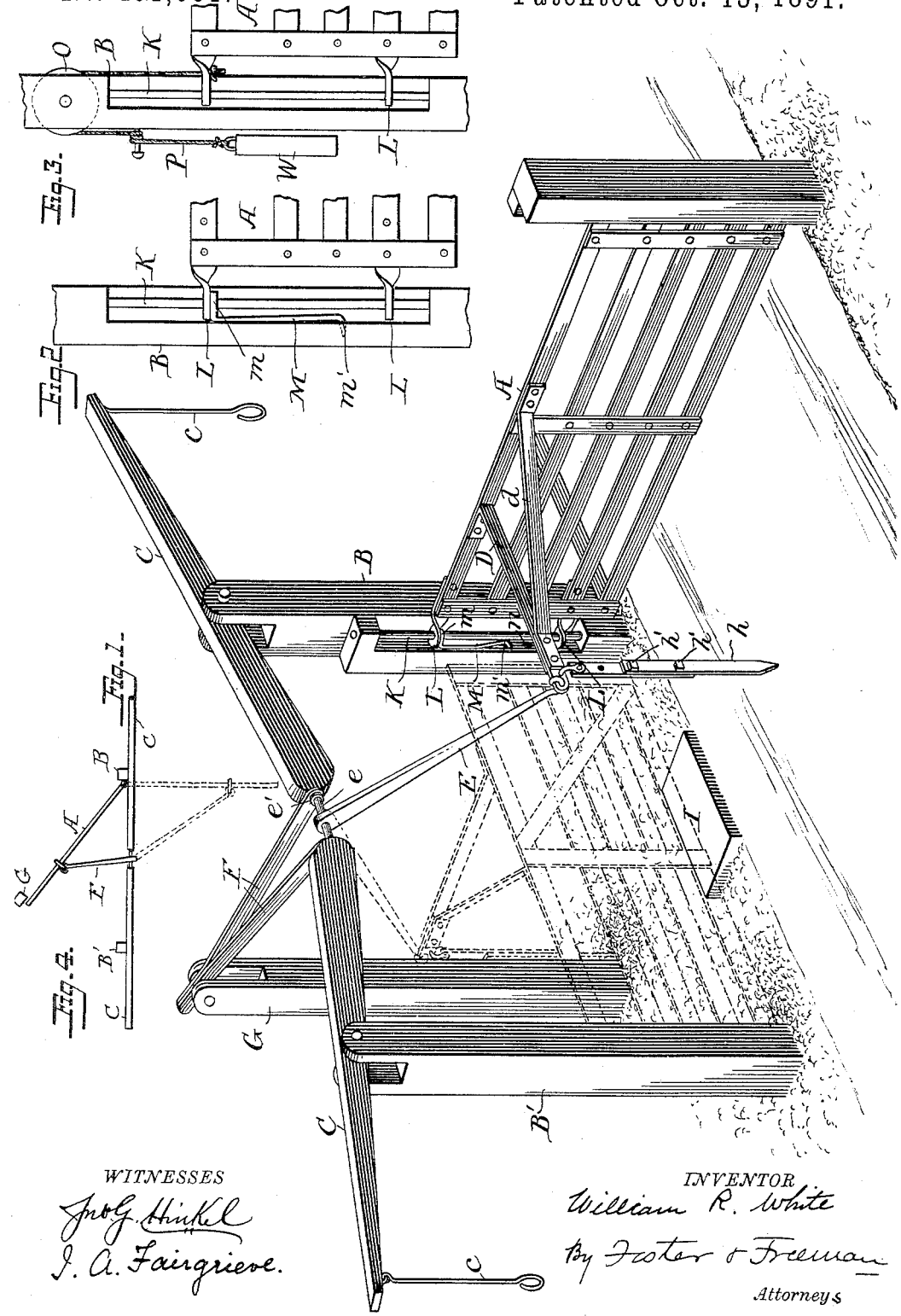
WITNESSES
Jno G. Hinkel
J. A. Fairgrieve.
INVENTOR
William R. White
By Foster & Freeman
Attorneys

UNITED STATES PATENT OFFICE.

WILLIAM RICHARD WHITE, OF BLOOMINGTON, ILLINOIS.

SWINGING GATE.

SPECIFICATION forming part of Letters Patent No. 461,061, dated October 13, 1891.

Application filed April 22, 1891. Serial No. 390,034. (No model.)

*To all whom it may concern:*

Be it known that I, WILLIAM RICHARD WHITE, a citizen of the United States, residing at Bloomington, McLean county, State of Illinois, have invented certain new and useful Improvements in Swinging Gates, of which the following is a specification.

My invention relates to swinging gates; and it consists in the novel construction and arrangement of the gate and its operating mechanism hereinafter described, and illustrated in the accompanying drawings, in which—

Figure 1 is a perspective view of a gate embodying my improvements. Figs. 2 and 3 are details; and Fig. 4 is a diagram showing a modification.

The objects of the present invention are to improve the devices for operating swinging gates, to dispense with ordinary hinges for connecting gates to gate-posts and to provide ready means for adjusting the gates vertically so as to regulate the distance between the gate and the ground and permit it to be raised to swing freely over snow or other obstructions.

In the accompanying drawings, A represents a gate of ordinary construction, which is pivotally connected to a post B and arranged to open outward to the post B'.

The gate is shown in full lines in its closed position and in dotted lines in its open position.

In order to open and close the gate in the most convenient manner without dismounting from the horse or vehicle, I provide two operating-levers C, one extending to each side of the gate and each being provided at its outer end with a handle c, extending downward to a convenient point. The operating-levers are pivoted loosely to the upper ends of the posts B and B', said posts being separated a distance about equal to the length of the gate, so that the outer end of the gate when open rests against the post B'. Upon the side of the gate and preferably distant from the hinge about one-third the length of the gate is an arm D, extending in the direction of the post B'. The arm D is preferably strengthened by a brace-piece d. At its outer end a connecting-rod E is hooked through an eye in the arm, so as to form a universal joint therewith, and the other end of the rod E is pivotally connected to the inner ends of the operating-levers by means of a pin e, fixed to the connecting-rod and having its ends loosely pivoted in the ends of the operating-levers. In order to prevent pin e from sliding lengthwise and becoming disconnected from the levers C, I provide it with collars e' at either end.

The operation of the gate by means of the appliances so far described is as follows: When the gate is shut, as shown in full lines, Fig. 1, the connecting-rod E is in an inclined position about midway between horizontal and vertical. If, now, the outer end of either of the operating-levers is drawn down the inner ends will be raised, carrying with them the rod E, which, owing to the weight of the gate on its lower end, will tend to swing into a vertical position, and the pull thus exerted upon the arm D will open the gate. The momentum required by the gate will usually carry it to its extreme open position, as shown in dotted lines. If, however, it tends to stop while the rod E is on either side of its middle or vertical position, the weight of the inner ends of the operating-levers, which are purposely made heavier than the outer ends, will cause the gate either to open or to close according to the inclination of the connecting-rod. Should the gate close, a more vigorous pull on the operating-lever will open it as desired. The movement of the inner ends of the operating-levers is first upward as the gate starts from either position and then downward, so that whether the gate is open or closed the connecting-piece E will be inclined to the vertical plane through the operating-levers, the levers will have the same position and a downward pull upon the outer end of either lever will open or close the gate.

As the normally-inclined position of the rod E brings a lateral strain upon the operating-levers in opening or closing the gate, I usually provide a guide rod or rods F, pivotally connected to a fixed post or support G and to the pin e, thus giving lateral supports to the levers C without interfering with their vertical movements.

It sometimes, though rarely, happens that the gate lodges in its middle position with the rod E vertical, which position we may designate as its "dead-center." In order to provide for throwing the gate off its dead-center, I connect pivotally to the outer end of the arm D a pendent rod H, which is preferably made in two sections and adjustable in length, so as to be readily accommodated to the height to which the gate is adjusted. A convenient way of adjusting the rod H is to form the main portion of the rod with a series of perforations and attach to it a foot portion $h$ by means of bolts $h'$ or other suitable fastenings. Midway between the posts B B', I plant a stone or block of wood I, so as to intercept the lower end of the rod H as the gate swings past its middle position. If now the gate should rest upon its dead-center the rod H would occupy an inclined position with its lower point resting on the block I, and in such case a vigorous pull upon the outer end of the operating-lever would raise the gate slightly and permit the rod H to assume a position more nearly vertical. On releasing the operating-lever the weight of the gate will cause the rod H to tilt to a more inclined position, thus carrying the gate over the dead-center in the direction it is desired it should go. Instead of the block I a slight elevation of the ground at the proper point will answer the same purpose.

I provide a simple and cheap connection between the gate and gate-post and one which permits of the gate being adjusted vertically, as follows: K is a rod of iron or steel considerably longer than the distance between the eyes L of the gate and having its ends fixed in the post B or a post adjacent thereto. The rod K passes through two eyes L, which are fixed to the gate and free to slide upon the rod. In order to support the gate at any desired elevation, I preferably provide a bracket M, having an offset or spur $m$ at one end, provided with an eye through which the rod K passes and an offset $m'$ at the other end, constructed to enter any one of a series of holes $n$ in the gate-post. When it is desired to raise the gate for the purpose of permitting it to swing freely over snow or other obstructions, or to permit small animals to pass underneath, the bracket M is arranged with its projection $m'$ in one of the higher holes in the post; but ordinarily the gate will be located within a few inches of the ground, with the bracket in one of the lower holes $n$.

In Fig. 2 I have shown an enlarged detail view of the bracket M, above described, and in Fig. 3 I have shown a modified form of device for sustaining the gate at various elevations. The latter construction consists of a pulley O at the upper end of the post B and in line with the rod K. Over this pulley passes a cord or chain P, one end of which is connected to the gate and the other end to a weight W upon the side of the post opposite the gate. The weight need not be as heavy as the gate, but should be large enough to prevent the rope from slipping after it has been twisted several times around a pin R which projects from the post. By releasing the rope from the pin and pulling down the weight the gate may be raised to any desired position, and it may be retained permanently in this position by twisting the rope several times about the pin.

The posts B B' are arranged in a line parallel with the roadway and at one side thereof, so that none of the operating devices of the gate interfere with the passage of vehicles or large loads of hay or other material along the roadway.

It will be evident that the arm D may in some instances be dispensed with and the connecting-rod E joined directly to the gate by a universal connection, as shown in Fig. 4. In such case the post B' should be arranged far enough from the post B to permit the gate to swing past it to a position either against the post G or against the fence. In the latter position it will have to turn about one hundred and eighty degrees in order to close, and the operation of opening and closing will be the same as that described with reference to my preferred form shown in Fig. 1.

Without limiting myself to the precise construction and arrangement of parts shown, I claim—

1. The combination, with a swinging gate having an arm extending at right angles thereto, of the vertically-movable operating-levers extending to either side of the gate, and a rod between the outer end of the arm and the inner ends of the levers, substantially as described.

2. The combination, with a swinging gate having an arm extending at right angles thereto, of the operating-levers and their supporting-posts, the connection between the operating-levers and the arm, and the guide-connection between a fixed support and the adjacent ends of the operating-levers for steadying the latter, substantially as described.

3. The combination, with a swinging gate having an arm, of operating-levers connected to the arm, and a pendent rod also connected to the arm and arranged to drag upon the ground, substantially as described.

4. The combination, with a swinging gate having an arm, of a pendent rod pivotally connected to the arm and adjustable in length, substantially as described, and for the purpose set forth.

In testimony whereof I have signed my name to this specification in the presence of two subscribing witnesses.

WILLIAM RICHARD WHITE.

Witnesses:
A. E. STEVENSON,
EMMA J. ASHBY.